United States Patent
Wu et al.

(10) Patent No.: US 10,329,162 B2
(45) Date of Patent: Jun. 25, 2019

(54) METHODS FOR PREPARING NICKEL-COBALT-ALUMINUM PRECURSOR MATERIAL AND CATHODE MATERIAL WITH GRADIENT DISTRIBUTION OF ALUMINUM ELEMENT

(71) Applicant: Guangzhou Libode New Material Co., Ltd., Guangdong (CN)

(72) Inventors: Ceng Wu, Guangdong (CN); Chaopu Tan, Guangdong (CN); Liang Yan, Guangdong (CN); Dianhua Huang, Guangdong (CN); Ruixiang Chen, Guangdong (CN); Zheng Zhang, Guangdong (CN); Changjie Yuan, Guangdong (CN); Hongjun Luo, Guangdong (CN)

(73) Assignee: Guangzhou Libode New Material Co., Ltd., Guangdong (CN)

( * ) Notice: Subject to any disclaimer, the term of this patent is extended or adjusted under 35 U.S.C. 154(b) by 0 days.

(21) Appl. No.: 15/538,131

(22) PCT Filed: May 6, 2016

(86) PCT No.: PCT/CN2016/081350
§ 371 (c)(1),
(2) Date: Jun. 20, 2017

(87) PCT Pub. No.: WO2016/180288
PCT Pub. Date: Nov. 17, 2016

(65) Prior Publication Data
US 2018/0044200 A1    Feb. 15, 2018

(30) Foreign Application Priority Data
May 8, 2015 (CN) .......................... 2015 1 0233112

(51) Int. Cl.
| | |
|---|---|
| *C01G 53/00* | (2006.01) |
| *H01M 4/1391* | (2010.01) |
| *H01M 4/525* | (2010.01) |
| *H01M 4/1393* | (2010.01) |
| *H01M 4/02* | (2006.01) |

(52) U.S. Cl.
CPC .......... *C01G 53/006* (2013.01); *C01G 53/42* (2013.01); *H01M 4/1391* (2013.01);
(Continued)

(58) Field of Classification Search
CPC ...... C01G 53/06; C01G 53/006; C01G 53/42; H01M 4/525; H01M 4/1391; H01M 2004/028; H01M 4/1393
(Continued)

(56) References Cited

U.S. PATENT DOCUMENTS

| | | | |
|---|---|---|---|
| 8,546,018 B2 | 10/2013 | Kajiyama | |
| 2015/0364759 A1* | 12/2015 | Kase | C01G 53/00 429/220 |

FOREIGN PATENT DOCUMENTS

| | | |
|---|---|---|
| CN | 103078109 A | 5/2013 |
| CN | 103400973 A | 11/2013 |

(Continued)

OTHER PUBLICATIONS

Translation of CN-103553152, Feb. 2014. (Year: 2014).*
(Continued)

Primary Examiner — Steven J Bos
(74) Attorney, Agent, or Firm — Reising Ethington, P.C.

(57) ABSTRACT

Provided are methods for preparing a nickel-cobalt-aluminum precursor material and a cathode material with a gradient distribution of aluminum element. The precursor material and the cathode material based on the precursor material prepared by the methods are of sphere or sphere-like shapes in which the distribution of the aluminum element is changed in a gradient manner, and the particle (Continued)

size distribution is uniform. The synthesized material has a high tap density, is not sensitive to ambient carbon dioxide and moisture, and has a good processability, a high specific capacity and a good stability property.

20 Claims, 4 Drawing Sheets

(52) U.S. Cl.
CPC ......... *H01M 4/1393* (2013.01); *H01M 4/525* (2013.01); *C01P 2002/72* (2013.01); *C01P 2004/03* (2013.01); *C01P 2004/32* (2013.01); *C01P 2006/40* (2013.01); *H01M 2004/028* (2013.01)

(58) Field of Classification Search
USPC ................................... 423/600, 594.3, 594.4
See application file for complete search history.

(56) References Cited

FOREIGN PATENT DOCUMENTS

| | | |
|---|---|---|
| CN | 103553152 A | 2/2014 |
| CN | 13715424 A | 4/2014 |
| CN | 103928673 A | 7/2014 |
| CN | 104134798 A | 11/2014 |
| CN | 104201369 A | 12/2014 |
| CN | 104409716 A | 3/2015 |
| CN | 104425815 A | 3/2015 |
| CN | 104934595 A | 9/2015 |
| JP | 2009259798 A | 11/2009 |
| JP | 2010024083 A | 2/2010 |
| JP | 2010092817 A | 4/2010 |
| JP | 2010114088 A | 5/2010 |
| JP | 2010170741 A | 8/2010 |
| WO | 2007/114557 A1 | 10/2007 |

OTHER PUBLICATIONS

Translation of CN-104934595, Sep. 2015. (Year: 2015).*
Translation of CN-104425815, Mar. 2015. (Year: 2015).*
International Search Report for PCT/CN2016/081350 dated Jun. 28, 2016, 5 pages.
English Translation of International Search Report for PCT/CN2016/081350 dated Jun. 28, 2016, 3 pages.
Chinese Office Action for Application No. 201510233112.6 dated Oct. 9, 2016, 7 pages.
Japanese Application Notice of Rejection dated Feb. 13, 2018, 3 pages.

* cited by examiner

METHODS FOR PREPARING NICKEL-COBALT-ALUMINUM PRECURSOR MATERIAL AND CATHODE MATERIAL WITH GRADIENT DISTRIBUTION OF ALUMINUM ELEMENT

CROSS-REFERENCE TO RELEVANT APPLICATIONS

The present application is the US national phase of PCT application No. PCT/CN2016/081350, which was filed on May 6, 2016 and titled "METHODS FOR PREPARING NICKEL-COBALT-ALUMINUM PRECURSOR MATERIAL AND CATHODE MATERIAL WITH GRADIENT DISTRIBUTION OF ALUMINUM ELEMENT", which claims priority from Chinese Patent Application No. 201510233112.6, which was filed on May 8, 2015 and titled "METHODS FOR PREPARING NICKEL-COBALT-ALUMINUM PRECURSOR MATERIAL AND CATHODE MATERIAL WITH GRADIENT DISTRIBUTION OF ALUMINUM ELEMENT", which is incorporated herein by reference in its entirety.

TECHNICAL FIELD

The present disclosure relates to the field of manufacture of lithium ion batteries, and specifically to methods for preparing a nickel-cobalt-aluminum precursor material and a cathode material with gradient distribution of aluminum element.

BACKGROUND ART

So far, lithium ion batteries have been widely used in the fields of various mobile electronic products and electric tools. The cathode material is a key to improving the energy density and the safety and reducing the cost in lithium ion batteries. Further improving the power density, the energy density and the safety performance of the material is the recent direction of the development in cathode materials for lithium ion batteries.

Among many candidate materials alternative to $LiCoO_2$, $LiNiO_2$ has drawn great attention due to its high capacity, low cost and low pollution. $LiNi_{1-x}Co_xO_2$, in addition to its advantages of high specific capacity and low cost in comparison with $LiNiO_2$, has a relatively good cycling performance. $LiNi_{1-x}Co_xO_2$ can show a specific capacity of 190 mAh/g. However, the stability of the nickel-cobalt binary material still cannot meet the current requirements of 3 C (consumer electronics, computer, communication) electronic products and power batteries on the materials.

Bulk doping and surface coating are the most major methods for improving the stability of nickel-based materials. As a nickel-cobalt-aluminum material representing aluminum-doped materials, $LiNi_{1-x-y}Co_xAl_yO_2$ is an isomorphic solid solution of $LiNiO_2$, $LiCoO_2$ and $LiAlO_2$. It has advantages including high energy density, good thermal stability, low cost, and environmental friendliness, and has become a high-end energy-storage material in the fields of 3 C and power batteries. However, due to the thermodynamic instability of trivalent nickel, the NCA (lithium nickel cobalt aluminate material) is difficult to be synthesized. Divalent nickel ions are difficult to be oxidized to trivalent ones, and can be oxidized completely only under an atmosphere of pure oxygen. In addition, since the NCA is strongly hygroscopic, the reactions shown in the following equations occur, and normally the battery can be produced only under a humidity of less than 10%. Since NCA is prone to releasing $O_2$, $CO_2$, etc., the battery is easy to become swollen, and it is best manufactured as a 18650 type cylindrical battery.

$$LiNi_{1-x-y}Co_xAl_yO_2+H_2O \rightarrow Ni_{1-x-y}Co_xAl_yO+LiOH+O_2$$

$$LiOH+CO_2 \rightarrow Li_2CO_3$$

$$Li_2CO_3+HF \rightarrow LiF+CO_2$$

Due to the structural characteristics of the material per se, the conditions for preparing NCA materials and nickel-cobalt-aluminum-lithium batteries with stable structures are very harsh. Currently, nickel-cobalt-aluminum-lithium cathode materials produced domestically still have the defects including fast capacity attenuation in the charge-discharge process, poor rate performance, and very poor storage performance. Therefore, in order to meet the requirements for mild production process, and to prepare nickel-cobalt-aluminum materials with excellent performances, it is necessary to develop a novel nickel-cobalt-aluminum precursor.

In the process for preparing a lithium nickel cobalt aluminate cathode material, as limited by calcining regime, $Al^{3+}$ ions are very difficult to form a solid solution with Ni—Co at around 750° C. Accordingly, the method of solid-state mixing and sintering of separate nickel, cobalt and aluminum raw materials is seldom used. At present, $Ni_{1-x-y}Co_xAl_y(OH)_2$ is generally considered as the best precursor for preparing high-performance nickel-cobalt-aluminum. Co-precipitation method is a simple and practical method for preparation and surface modification of $LiNiCoAlO_2$. The key to co-precipitation of Ni, Co and Al is to overcome the problem that $Al^{3+}$ is prone to hydrolysis to precipitate separately and therefore is difficult to form a precursor with a homogeneous structure with nickel and cobalt elements, and cannot form a high-density spherical nickel-cobalt-aluminum material. To address the problem that $Al^{3+}$ is prone to hydrolysis, patent documents CN103094546A and CN103553152A proposed a method in which a complexing solution of aluminum is prepared separately as a source of aluminum, which is fed as a concurrent flow with a solution of nickel and cobalt salts, a solution of sodium hydroxide, and a solution of ammonia to prepared spherical nickel-cobalt-aluminum by controlling the crystallization. However, said method has the following problems: 1. the nickel-cobalt-aluminum precursor thus prepared usually comprises a great amount of residue sulfate ions, which are difficult to be removed by washing; 2. the aging treatment with 5 wt %-15 wt % solution of sodium hydroxide as disclosed in CN103553152A is beneficial for sulfur removal, but the washing process often leads to loss of surface aluminum element, i.e. aluminum deficiency on the surface of the prepared material, which is disadvantageous for the storage performance, the processability and the electrochemical cycling stability of the cathode material. The cycling stability, the safety performance, the processability and the storage performance of the material may be improved by increasing the doping amount of aluminum. However, the introduction of a great amount of the light metal, aluminum, would lead to reduction in the true density of the material per se and reduction in the bulk energy density of the material. In addition, the introduction of Al element, which does not have an electrical activity, would definitely lead to reduction in the energy density of the material per se. Therefore, it has become a hot spot in research to prepare a material with high energy density, high stability, excellent storage performance and processability under a relatively low doping amount of Al.

Yang-Kook Sun of Hanyang University, South Korea, developed a novel gradient material for lithium ion batteries as early as in 2008. The core of the material is a nickel-cobalt-manganese ternary material with a relatively high nickel content, and the outer coating layer is a nickel-cobalt-manganese material in which the content of nickel gradually decreases while the contents of manganese and cobalt gradually increase. Such a special cathode material shows high energy density, long service life and good safety performance. Many literatures and patent documents in China also reported methods for the preparation of cathode materials for lithium ion batteries with ingredient change of doping elements (Ni, Co, Mn, Mg, Al, Ti, Zr, etc.). Among these, the patent applications for invention CN102214819A, CN103078109A and CN103715424A all relate to co-precipitation methods for the preparation of hydroxide precursors with gradient distributions of Al element. However, in all these methods, hydroxide precursors with gradient change of aluminum element are prepared by gradually adding a solution of aluminum salt into a mixed solution of nickel and cobalt salts to control the gradual change of the aluminum concentration in the mixed solution of nickel, cobalt and aluminum salts. In the ammonia complexing system used in the methods, $Al^{3+}$ hardly complexes with ammonia. $Al^{3+}$ is prone to hydrolysis to form a colloid separately, so that gradient doping of $Al^{3+}$ element in nickel-cobalt-manganese hydroxide cannot be achieved, which is disadvantageous for the preparation of high-density spherical precursor in which aluminum is gradiently doped.

SUMMARY

The present disclosure provides a method for preparing a spherical nickel-cobalt-aluminum hydroxide precursor material by co-precipitation method, and a method for preparing a gradient-aluminum-type lithium-nickel-cobalt-aluminum oxide cathode material for lithium ion batteries based on said method, so as to overcome and avoid the defects and disadvantages of the prior art, and to provide a simple, feasible and easy-to-control method to prepare a gradient-aluminum-type lithium-nickel-cobalt-aluminum oxide cathode material for lithium ion batteries which has excellent electrochemical performance, excellent processability and storage performance.

According to a first nonlimiting aspect, it is provided a method for preparing a spherical nickel-cobalt-aluminum hydroxide precursor material by co-precipitation method, which comprises the following steps:

a) preparing an aqueous solution of nickel and cobalt salts with mixed nickel and cobalt salts, a solution containing a complexing agent I, a solution containing a complexing agent II, and a solution of sodium hydroxide, and mixing an aluminum salt with the complexing agent I to prepare an aluminum-containing complexing solution;

b) adding a base liquid containing the complexing agent II in advance into a reaction kettle; and c) adding the aqueous solution of nickel and cobalt salts, the solution containing the complexing agent I, the solution containing the complexing agent II, the aluminum-containing complexing solution, and the solution of sodium hydroxide into the reaction kettle under continuous stirring to conduct a precipitation reaction to obtain the precursor material, wherein the aqueous solution of nickel and cobalt salts, the solution containing the complexing agent II, and the solution of sodium hydroxide are each added into the reaction kettle at a constant flow rate, and the aluminum-containing complexing solution and the solution containing the complexing agent I are added in the following manner: the aluminum-containing complexing solution is added at a constant flow rate into a fixed volume of the solution containing the complexing agent I and mixed thereto, while the mixture of the aluminum-containing complexing solution and the solution containing the complexing agent I is added into the reaction kettle at a constant flow rate, so that the concentration of aluminum in the mixed solution is gradually increased.

According to an embodiment of the present disclosure, the nickel salt in the method is one or more of nickel sulfate, nickel chloride, nickel acetate and nickel nitrate According to an embodiment of the present disclosure, the cobalt salt in the method is one or more of cobalt sulfate, cobalt chloride, cobalt acetate and cobalt nitrate According to an embodiment of the present disclosure, the complexing agent I in the method is one or more of triethanolamine, ammonium fluoride, citric acid, oxalic acid, sodium ethylene diamine tetraacetate and sodium hydroxide.

According to an embodiment of the present disclosure, the complexing agent II in the method is one or more of aqueous ammonia, triethanolamine, ammonium fluoride, citric acid, oxalic acid and sodium ethylenediamine tetraacetate.

According to an embodiment of the present disclosure, the aluminum salt in the method is one or more of aluminum nitrate, aluminum sulfate and aluminum acetate.

According to one embodiment of the present disclosure, a molar ratio of the nickel salt to the cobalt salt in the aqueous solution of nickel and cobalt salts in the method ranges from 1 to 19. For example, the molar ratio of the nickel salt to the cobalt salt in the aqueous solution of nickel and cobalt salts may be 1, 2, 3, 4, 5, 6, 7, 8, 9, 10, 11, 12, 13, 14, 15, 16, 17, 18 or 19.

According to one embodiment of the present disclosure, a total concentration of the nickel salt and the cobalt salt in the aqueous solution of nickel and cobalt salts in the method ranges from 0.2 to 2.5 mol/L. For example, the total concentration of the nickel salt and the cobalt salt in the aqueous solution of nickel and cobalt salts may be 0.2 mol/L, 0.4 mol/L, 0.6 mol/L, 0.8 mol/L, 1.0 mol/L, 1.2 mol/L, 1.4 mol/L, 1.6 mol/L, 1.8 mol/L, 2.0 mol/L, 2.2 mol/L or 2.5 mol/L.

According to an embodiment of the present disclosure, a concentration of the solution of sodium hydroxide in the method ranges from 2 to 10 mol/L. For example, the concentration of the solution of sodium hydroxide may be 2 mol/L, 3 mol/l, 4 mol/l, 5 mol/l, 6 mol/l, 7 mol/L, 8 mol/L, 9 mol/L or 10 mol/L.

According to an embodiment of the present disclosure, a molar ratio of aluminum element to the complexing agent I in the aluminum-containing complexing solution in the method is within the range of 1:0.01-20.0. For example, the molar ratio of aluminum element to the complexing agent I in the aluminum-containing complexing solution may be 1:0.01, 1:0.05, 1:0.1, 1:0.2, 1:0.3, 1:0.3, 1:0.4, 1:0.5, 1:0.6, 1:0.7, 1:0.8, 1:0.9, 1:1.0, 1:1.5, 1:2.0, 1:2.5, 1:3.0, 1:3.5, 1:4.0, 1:4.5, 1:5.0, 1:5.5, 1:6.0, 1:6.5, 1:7.0, 1:7.5, 1:8.0, 1:8.5, 1:9.0, 1:10.0, 1:11.0, 1:12.0, 1:13.0, 1:14.0, 1:15.0, 1:16.0, 1:17.0, 1:18.0, 1:19.0 or 20.0.

According to an embodiment of the present disclosure, a concentration of the complexing agent II in the base liquid in the method ranges from 0.3 to 2 mol/L. For example, the concentration of the complexing agent II in the base liquid may be 0.3 mol/L, 0.4 mol/L, 0.5 mol/L, 0.6 mol/L, 0.7 mol/L, 0.8 mol/L, 0.9 mol/L, 1.0 mol/L, 1.1 mol/L, 1.2 mol/L, 1.3 mol/L, 1.4 mol/L, 1.5 mol/L, 1.6 mol/L, 1.7 mol/L, 1.8 mol/L, 1.9 mol/L or 2.0 mol/L.

According to an embodiment of the present disclosure, pH of the base liquid in the method ranges from 10 to 12. For example, the pH of the base liquid may be 10, 10.2, 10.4, 10.6, 10.8, 11, 11.2, 11.4, 11.6, 11.8 or 12.

According to an embodiment of the present disclosure, a ratio of the flow rates for adding the aqueous solution of nickel and cobalt salts, the solution containing the complexing agent II, the solution of sodium hydroxide, and the mixed solution into the reaction kettle in the method is within the range of 1:(0.05-50):(0.1-10):(0.01-100).

According to an embodiment of the present disclosure, a flow rate for adding the aluminum-containing complexing solution into the fixed volume of the solution containing the complexing agent I in the method ranges from 0.1 mL/min to 2000 mL/min.

According to an embodiment of the present disclosure, a stirring speed in the reaction kettle in the method ranges from 50 to 1000 r/min.

According to an embodiment of the present disclosure, a reaction temperature in step c) of the method ranges from 20 to 80° C.

According to an embodiment of the present disclosure, a reaction time in step c) of the method ranges from 5 to 100 hours.

According to a second nonlimiting aspect, it is provided a method for preparing a gradient-aluminum-type lithium-nickel-cobalt-aluminum oxide cathode material for lithium ion batteries, wherein the method comprises the following steps:

1) preparing a spherical nickel-cobalt-aluminum hydroxide precursor material with the method described in the first aspect;

2) washing, filtering and drying the precursor material obtained in step 1); and 3) uniformly mixing the precursor material with lithium hydroxide, calcining in a furnace in an oxygen atmosphere, and cooling to room temperature to obtain the gradient-aluminum-type composite cathode material for lithium ion batteries.

According to an embodiment of the present disclosure, step 2) of the method comprises: stirring and washing the precursor material with a solution of sodium chloride having a concentration of 3-30 wt % for 10-60 minutes at 20-80° C.; b) washing the precipitate several times with deionized water at 20-80° C. until the final pH value is lower than 10; and c) placing the washed wet material under 60-150° C. and drying for 6-60 h.

According to an embodiment of the present disclosure, step 3) of the method comprises: uniformly mixing the washed and dried precursor material with lithium hydroxide; calcining in a furnace in an oxygen atmosphere under 650-850° C. for 10-30 h; and cooling to room temperature to obtain the gradient-aluminum-type lithium-nickel-cobalt-aluminum oxide cathode material.

To address the problem that $Al^{3+}$ is prone to hydrolysis, the following method is proposed. A complexing solution containing aluminum is separately prepared as a source of aluminum. The source solution of aluminum is gradually added into an intermediate solution (i.e. the solution containing the complexing agent I) so that the concentration of aluminum in the mixed solution is gradually increased. The mixed solution with gradually increased aluminum concentration, the solution of nickel and cobalt salts, the solution of sodium hydroxide, and the solution of the complexing agents are added concurrently into the reaction kettle for a continuous reaction, so that aluminum element is gradiently distributed in the precursor from the center to the surface of the spheres. In the spherical nickel-cobalt-aluminum material prepared by this method, the concentration of doped aluminum element is continuously increased from the core to the surface of the spheres, and the aluminum content at the surface can even reach 100%. In $LiNi_{1-x-y}Co_xAl_yO_2$ prepared from such a precursor, the concentration of doped aluminum element is continuously increased from the core to the surface of the spheres, and the aluminum content at the surface can even reach 100%. This not only improves the diffusion performance of lithium ions in the material body, but also fundamentally solves the stability problem of the material in air and electrolytes. In addition, the amount of doped aluminum can be reduced, so as to increase the energy density of the material. A series of nickel-based composite materials which are gradiently doped with aluminum are prepared by using the method according to the present disclosure: $LiNi_{0.815}Co_{0.15}Al_{0.035}O_2$, $LiNi_{0.85}Co_{0.10}Al_{0.05}O_2$ and $LiNi_{0.87}Co_{0.10}Al_{0.03}O_2$, etc., and all the prepared materials show high energy density, high safety stability and superior processability.

Therefore, the method for preparing a spherical nickel-cobalt-aluminum hydroxide precursor material by co-precipitation method, and the method for preparing a gradient-aluminum-type lithium-nickel-cobalt-aluminum oxide cathode material for lithium ion batteries based on said method provided by the present disclosure have a plurality of beneficial technical effects, including:

(1) In the gradient spherical nickel-cobalt-aluminum hydroxide precursor material and the cathode material prepared by using the methods according to the present disclosure, the concentration of aluminum is radially and gradually increased from the core to the surface of the particles, and reaches the maximum at the surface which may be as high as 100%.

(2) In the methods according to the present disclosure, by strictly controlling the conditions in the system, the preparation of the precursor can be realized in which the content of aluminum element is uniformly increased from the center, as the origin, to the surface of the spherical nickel-cobalt-aluminum hydroxide particles.

(3) In the gradient spherical nickel-cobalt-aluminum hydroxide precursor material and the cathode material prepared by using the methods according to the present disclosure, the moisture-proof performance is remarkably improved, the decomposition of the trivalent nickel is effectively avoided, and the sensitivity to humidity in the preparation and application of the material is greatly reduced, which are beneficial to the manufacture of NCA materials and associated batteries;

(4) Comparing with the methods in the prior art, some embodiments of the present disclosure further involve a NaCl desulfurization and washing step, which promotes the removal of hazardous impurities while reducing the loss of effective elements from the precursor, and is beneficial to the preparation of highly stable lithium-nickel-cobalt-aluminate cathode material.

(5) The lithium-nickel-cobalt-aluminate cathode material for batteries prepared by the method has advantages such as stable electrochemical performance, high energy density, good rate performance, high safety, low sensitivity to temperature and humidity, and excellent processability, and can be used for preparing power batteries meeting the requirements of electronic products and electric vehicles.

(6) By controlling the sintering process, a gradient-type lithium-nickel-cobalt-aluminate cathode material with a (7) The methods according to the present disclosure are simple and feasible, easy to control, environment-friendly, and efficient.

The above description is only a summary of the technical solutions of the present disclosure. In order to make the technical means of the present disclosure better understood so that the present disclosure may be implemented as described, and in order to make the foregoing and other objects, features and advantages of the present disclosure easier to be understood, specific embodiments of the present disclosure are illustrated hereinbelow.

BRIEF DESCRIPTION OF THE DRAWINGS

By reading the following detailed description of embodiments, various other advantages and benefits will become apparent to a person skilled in the art. The drawings are only used to illustrate embodiments, and should not be considered as limitations to the present disclosure. In the drawings.

SPECIFIC EMBODIMENTS

Exemplary embodiments of the present disclosure will be described below in more details. Although exemplary embodiments of the present disclosure are shown below, it should be understood that the present disclosure may be implemented in various forms which should not be limited to the embodiments set forth herein. Instead, these embodiments are provided to render a more thorough understanding of the present disclosure, and to convey the scope of the disclosure completely to a person skilled in the art. It should be understood that a person skilled in the art can recognize various methods, components, and contents which, although not explicitly described or disclosed in this specification, realize the present disclosure and are within the spirit, principle and scope of the present disclosure. All examples and conditional language recited in this specification are for purposes of illustration and teaching, so as to help the reader understand the principle and concept of the contributions made by the inventors to the prior art, which should not be construed as being limited to these specifically recited examples and conditions. In addition, for the sake of clarity, detailed descriptions of known methods, components and contents are omitted, so as not to obscure the description of the present disclosure. It should be understood that the features in various embodiments described herein may be combined with each other, unless specifically stated otherwise.

Example 1

The following solutions were prepared: 45 L aqueous solution of nickel and cobalt salts with a Ni+Co ion concentration of 2 mol/L and Ni:Co=81.5:15; 30 L solution of sodium hydroxide with a mass concentration of 32%; 20 L aqueous solution of ammonia (the solution containing the complexing agent II) with a concentration of 14 mol/L; 3.26 L solution of sodium metaaluminate (a complexing solution of aluminum and hydroxide) (the aluminum complexing solution) with an aluminum element content of 1 mol/L; and 41.74 L solution of sodium hydroxide (the solution containing the complexing agent I) with a pH value of 12.

40 L aqueous ammonia was added in advance into a 150 L reaction kettle at a temperature of 50° C. to give an aqueous solution having a ($NH_3 \cdot H_2O + NH_4^+$) concentration of 1 mol/L and a pH value of 11.50±0.02. The pH value was measured with a pH meter, and the ($NH_3 \cdot H_2O + NH_4^+$) concentration was measure with a chemical titration method and was adjusted by controlling the rate for adding concentrated aqueous ammonia.

Figure 1:
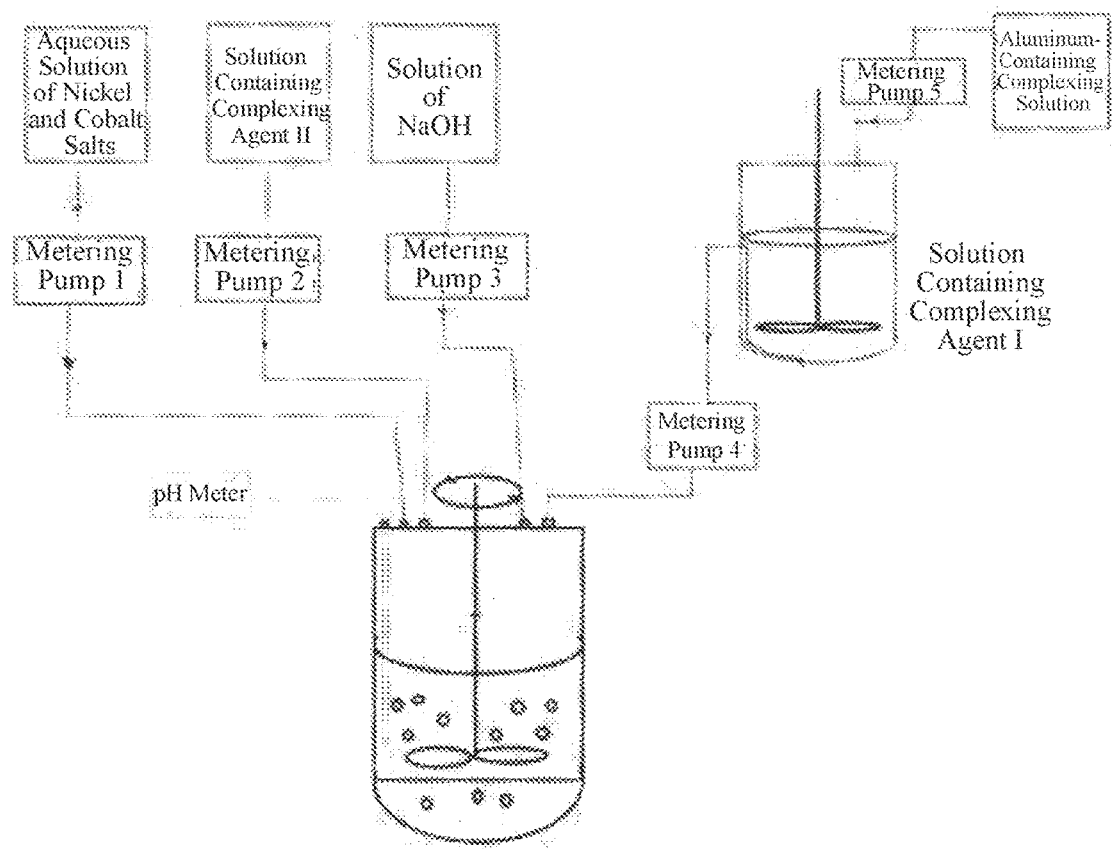
FIG. 1 is a schematic diagram of the mode for feeding various raw materials in the synthetic method of the present disclosure.

The aqueous solution of nickel and cobalt salts (20 mL/min), 30% solution of sodium hydroxide (10±2 mL/min), and 14 mol/L aqueous solution of ammonia (4±1 mL/min) were flowed into the reaction kettle. The solution of sodium metaaluminate was first added at a flow rate of 1.45 mL/min into a mixing container charged with 41.74 L solution containing the complexing agent I under continuous stirring, and the mixed solution was added simultaneously into the reaction kettle at a flow rate of 20 mL/min (see FIG. 1). The reaction temperature in the reaction kettle is 50° C.

Specifically, after the feeding was started, the volume of the solution containing the complexing agent I in the mixing container was continuously reduced while the solution of sodium metaaluminate was continuously added. Therefore, the concentration of aluminum element in the mixing container was higher and higher, so that the concentration of aluminum element in the mixed solution fed into the reaction kettle was also higher and higher, and the concentration of aluminum element in contact with the surface of precipitated particles was also increased. Finally, a gradient-aluminum-type nickel-cobalt-aluminum hydroxide precursor material was obtained in which aluminum element was radially distributed along the precipitated particles in ingredient.

Figure 2:
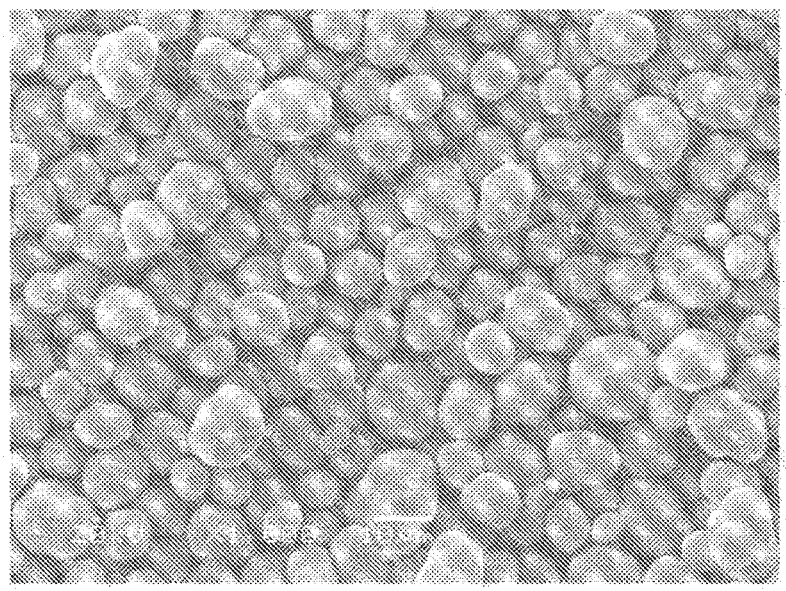
FIG. 2 is a SEM image of the precursor prepared in Example 1.
Figure 3:
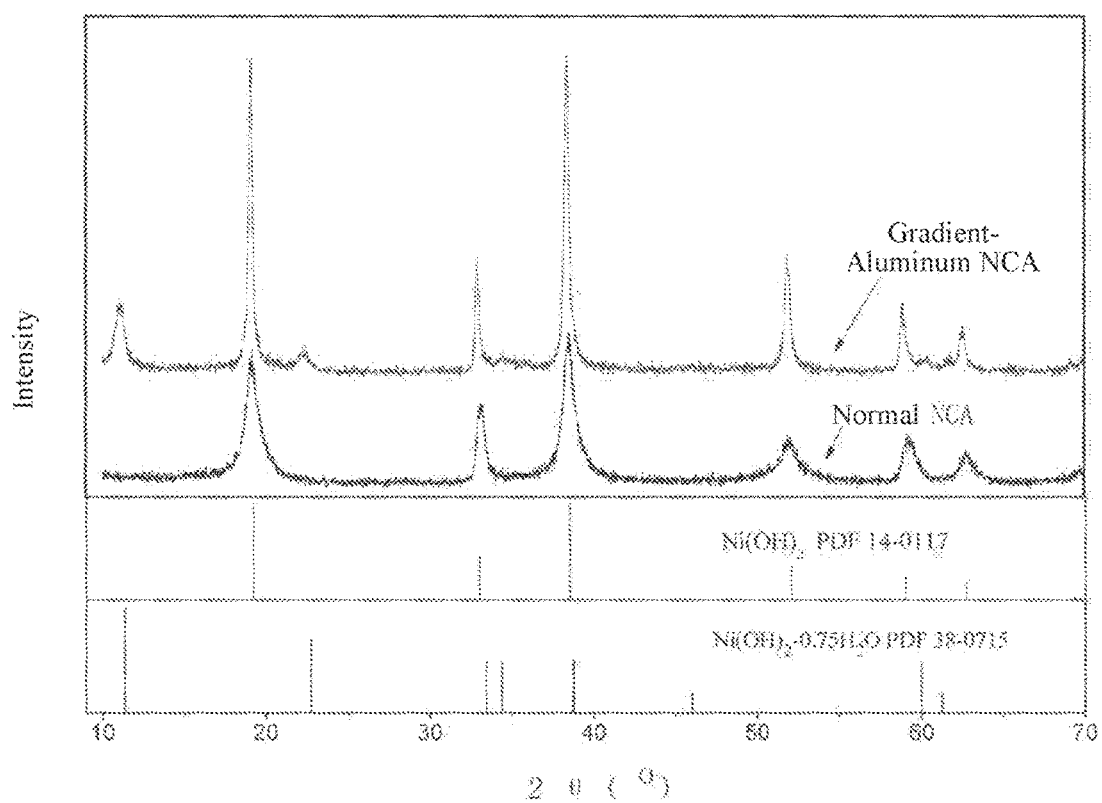
FIG. 3 shows a comparison of XRD patterns of the gradient-aluminum precursor prepared in Example 1 and a normal precursor prepared by co-precipitation.
Figure 4:
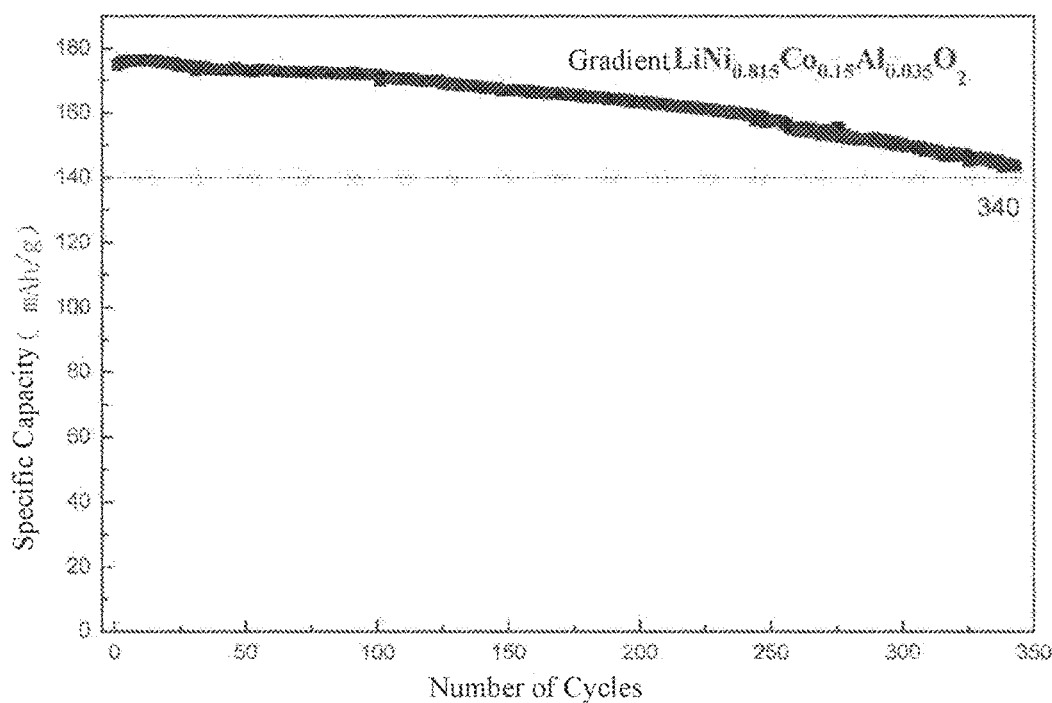
FIG. 4 shows the cycling performance curve of the cathode material prepared in Example 1.

During the process, the concentration of the complexing agents, the pH value and the particle size distribution were strictly controlled, and the reaction was quenched after the aqueous solution of nickel and cobalt salts was completely added. The slurry was aged for 30 minutes. The mother liquid was then filtered, and was stirred and washed with 10% solution of sodium chloride at 60° C. for 30 minutes. The slurry was washed, filtered and dried to give $Ni_{0.815}Co_{0.15}Al_{0.035}(OH)_2$ precursor with a surface aluminum concentration of 30 at % (see FIG. 2 for the SEM image thereof). As can be seen from the SEM image, the morphology of the precursor was spherical or spheroid, and the particle size distribution was concentrated. $Ni_{0.815}Co_{0.15}Al_{0.035}(OH)_2$ was uniformly mixed with stoichiometric amount of lithium hydroxide, then placed in a furnace and calcined in an oxygen atmosphere at 750° C. for 12 h, and cooled to room temperature to give the cathode material $LiNi_{0.815}Co_{0.15}Al_{0.035}O_2$, which was detected by XRD to have a single alpha-NaFeO$_3$ structure (see FIG. 3). The cathode material was charged and discharged at a voltage window of 2.8-4.3. The first discharge capacity at 0.1 C was 198 mAh/g, and the discharge specific capacity at 1 C was maintained at 174 mAh/g. After 300 cycles, the capacity retention rate is >82% (as shown in FIG. 4).

Example 2

The following solutions were prepared: 45 L aqueous solution of nickel and cobalt salts with a Ni+Co ion concentration of 2 mol/L and Ni:Co=80:15; 30 L solution of sodium hydroxide with a mass concentration of 30%; 10 L solution of EDTA (ethylene diamine tetraacetic acid) (the solution containing the complexing agent II) with a concentration of 1 mol/L; 2.37 L solution of Al-EDTA (the aluminum complexing solution) with an aluminum element content of 2 mol/L; and 42.63 L solution of EDTA (the solution containing the complexing agent I) with a concentration of 0.02 mol/L.

40 L aqueous solution of EDTA with a concentration of 0.05 mol/L and pH value of 11.20±0.02 was added in advance into a 150 L reaction kettle at a temperature of 50° C. The pH value was measured with a pH meter, and the EDTA concentration was measure with a chemical titration method and was adjusted by controlling the rate for adding the solution containing the complexing agent II.

The aqueous solution of nickel and cobalt salts (20 mL/min), 30% solution of sodium hydroxide (10±2 mL/min), and 1 mol/L solution of EDTA (3±1 mL/min) were flowed into the reaction kettle. The Al-EDTA complexing solution was first added at a flow rate of 1.05 mL/min into a mixing container charged with 42.36 L solution containing the complexing agent I under continuous stirring, and the mixed solution was added simultaneously into the reaction kettle at a flow rate of 20 mL/min (see FIG. 1). The reaction temperature in the reaction kettle is 50° C., and the stirring speed is 400 r/min.

Figure 5:
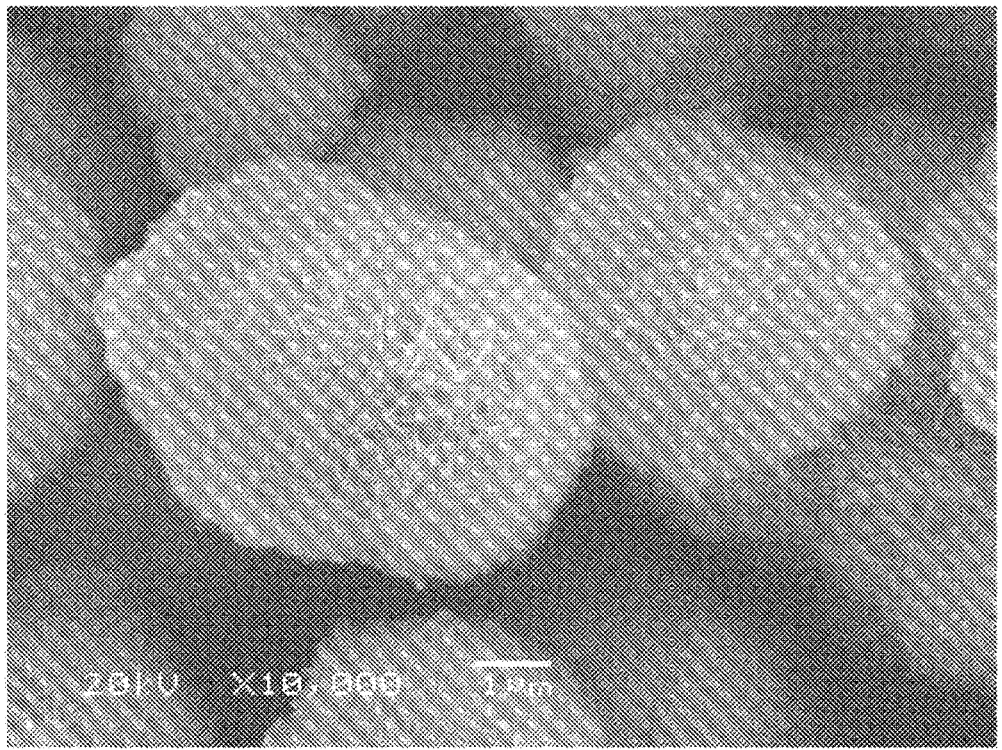
FIG. 5 is a SEM image of the precursor prepared in Example 2.
Figure 6A:
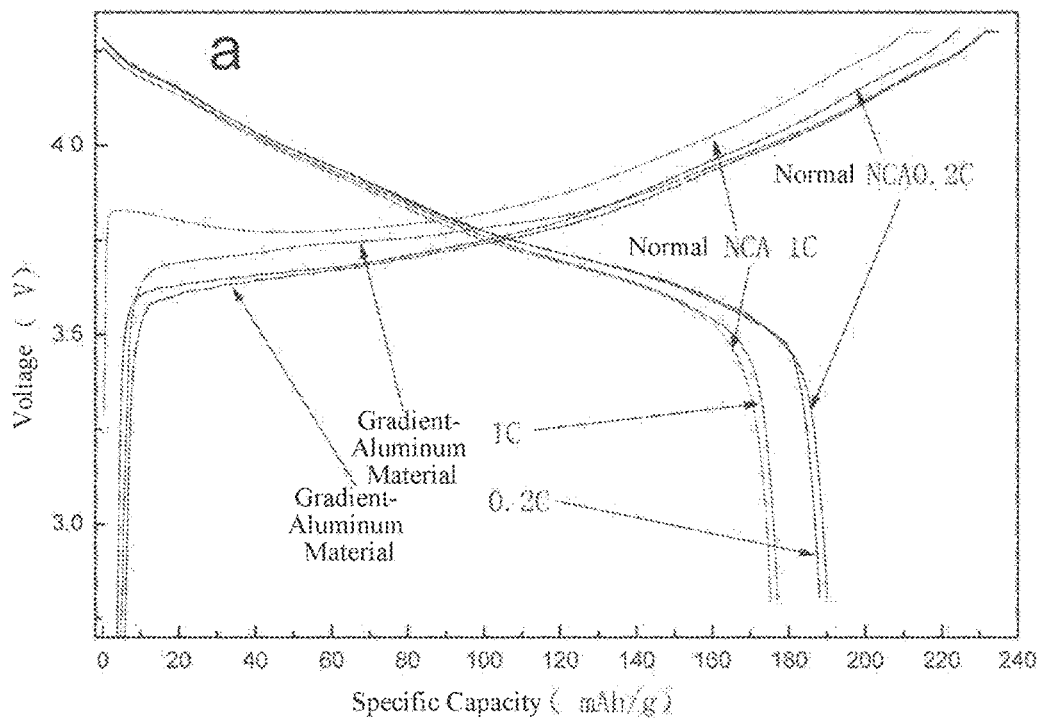
FIG. 6 shows comparisons of the charge-discharge curves (6a, at rates of 0.2 C and 1 C) and the cycle performance curves (6b) of the cathode material prepared in Example 2 and of a normal NCA material.
Figure 6B:
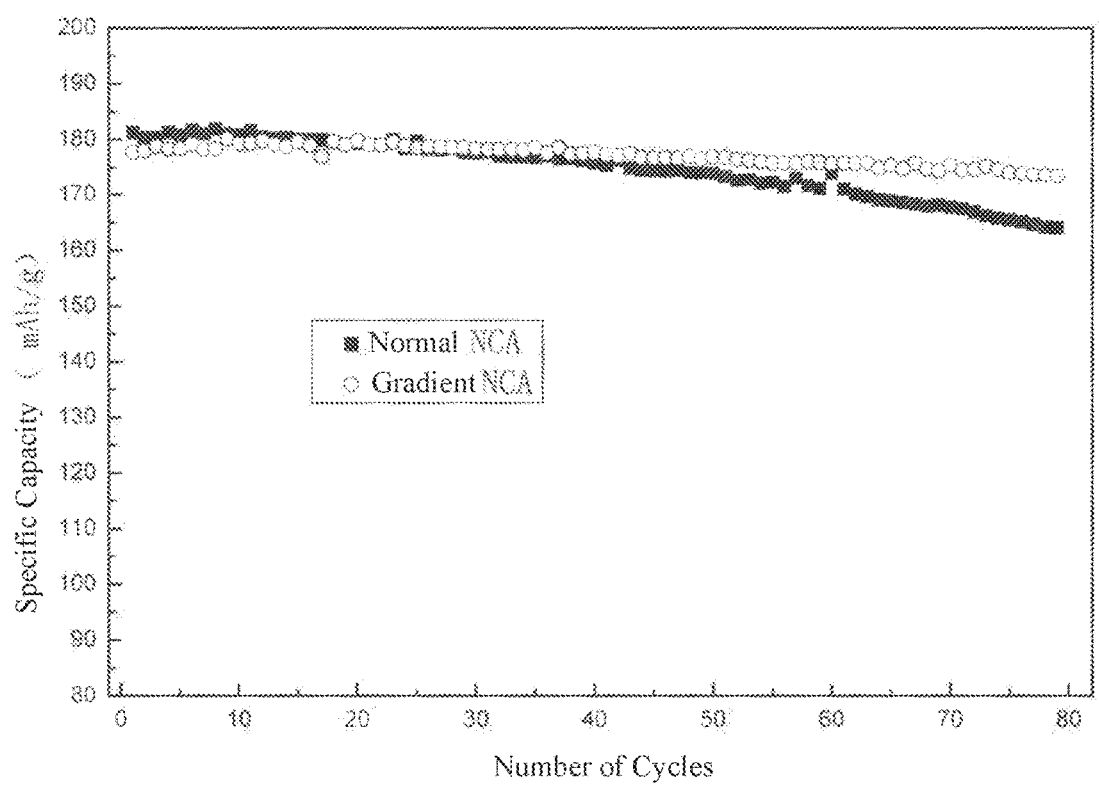

During the process, the concentration of the complexing agents, the pH value and the particle size distribution were strictly controlled, and the reaction was quenched after the aqueous solution of nickel and cobalt salts was completely added. The slurry was aged for 30 minutes. The mother liquid was then filtered, and was stirred and washed with 10% solution of sodium chloride at 60° C. for 30 minutes. The slurry was washed, filtered and dried to give Ni$_{0.80}$Co$_{0.15}$Al$_{0.05}$(OH)$_2$ precursor with a surface aluminum concentration of 50 at % (see FIG. 5 for the SEM image thereof). As can be seen from the SEM image, the morphology of the precursor was spherical or spheroid, and the particle size distribution was concentrated. Ni$_{0.80}$Co$_{0.15}$Al$_{0.05}$(OH)$_2$ was uniformly mixed with stoichiometric amount of lithium hydroxide, then placed in a furnace and calcined in an oxygen atmosphere at 750° C. for 12 h, and cooled to room temperature to give the cathode material LiNi$_{0.8}$Co$_{0.15}$Al$_{0.05}$O$_2$. The cathode material was charged and discharged at a voltage window of 2.8-4.3. The first discharge capacity at 0.2 C was 188 mAh/g, and the discharge specific capacity at 1 C was maintained at 178 mAh/g. The cycling performance was obviously superior to that of a common NCA material (see FIG. 6).

It should be noted that the above illustration of the described embodiments are not intended to limit the present disclosure, and various alternative embodiments may be designed by a person skilled in the art without departing from the scope of the appended claims. It will be apparent to a person skilled in the art that any improvement of the present disclosure, equivalent replacement of the selected components of the present disclosure, addition of auxiliary components, and selection of specific embodiments all fall within the protection scope and the disclosed scope of the present disclosure.

The invention claimed is:

1. A method for preparing a spherical nickel-cobalt-aluminum hydroxide precursor material by co-precipitation, which comprises the following steps:
   a) preparing an aqueous solution of nickel and cobalt salts with mixed nickel and cobalt salts, a solution containing a complexing agent I, a solution containing a complexing agent II, and a solution of sodium hydroxide, and mixing an aluminum salt with the complexing agent I to prepare an aluminum-containing complexing solution;
   b) adding a base liquid containing the complexing agent II in advance into a reaction kettle; and
   c) adding the aqueous solution of nickel and cobalt salts, the solution containing the complexing agent I, the solution containing the complexing agent II, the aluminum-containing complexing solution, and the solution of sodium hydroxide into the reaction kettle under continuous stirring to conduct a precipitation reaction to obtain the precursor material,
   wherein the aqueous solution of nickel and cobalt salts, the solution containing the complexing agent II, and the solution of sodium hydroxide are each added into the reaction kettle at a constant flow rate, and the aluminum-containing complexing solution and the solution containing the complexing agent I are added in the following manner: the aluminum-containing complexing solution is added at a constant flow rate into a fixed volume of the solution containing the complexing agent I and mixed thereto, while the mixture of the aluminum-containing complexing solution and the solution containing the complexing agent I is added into the reaction kettle at a constant flow rate, so that the concentration of aluminum in the mixed solution is gradually increased.

2. The method according to claim 1, wherein the nickel salt is at least one of nickel sulfate, nickel chloride, nickel acetate, or nickel nitrate.

3. The method according to claim 1, wherein the cobalt salt is at least one of cobalt sulfate, cobalt chloride, cobalt acetate, or cobalt nitrate.

4. The method according to claim 1, wherein the complexing agent I is at least one of triethanolamine, ammonium fluoride, citric acid, oxalic acid, sodium ethylene diamine tetraacetate, or sodium hydroxide.

5. The method according to claim 1, wherein the complexing agent II is at least one of aqueous ammonia, triethanolamine, ammonium fluoride, citric acid, oxalic acid, or sodium ethylene diamine tetraacetate.

6. The method according to claim 1, wherein the aluminum salt is at least one of aluminum nitrate, aluminum sulfate, or aluminum acetate.

7. The method according to claim 1, wherein a molar ratio of the nickel salt to the cobalt salt in the aqueous solution of nickel and cobalt salts ranges from 1 to 19.

8. The method according to claim 1, wherein a total concentration of the nickel salt and the cobalt salt in the aqueous solution of nickel and cobalt salts ranges from 0.2 to 2.5 mol/L.

9. The method according to claim 1, wherein a concentration of the solution of sodium hydroxide ranges from 2 to 10 mol/L.

10. The method according to claim 1, wherein a molar ratio of aluminum element and the complexing agent I in the aluminum-containing complexing solution is within the range of 1:0.01-20.0.

11. The method according to claim 1, wherein a concentration of the complexing agent II in the base liquid ranges from 0.3 to 2 mol/L.

12. The method according to claim 1, wherein a pH of the base liquid ranges from 10 to 12.

13. The method according to claim 1, wherein a ratio of flow rates for adding the aqueous solution of nickel and cobalt salts, the solution containing the complexing agent II, the solution of sodium hydroxide, and the mixed solution into the reaction kettle is within the range of 1:(0.05-50):(0.1-10):(0.01-100).

14. The method according to claim 1, wherein a flow rate for adding the aluminum-containing complexing solution into the fixed volume of the solution containing the complexing agent I ranges from 0.1 mL/min to 2000 mL/min.

15. The method according to claim 1, wherein a stirring speed in the reaction kettle ranges from 50 to 1000 r/min.

16. The method according to claim 1, wherein a reaction temperature in step c) of the method ranges from 20 to 80° C.

17. The method according to claim 1, wherein a reaction time in step c) of the method ranges from 5 to 100 hours.

18. A method for preparing a gradient-aluminum-type lithium-nickel-cobalt-aluminum oxide cathode material for lithium ion batteries, wherein the method comprises the following steps:

1) preparing a spherical nickel-cobalt-aluminum hydroxide precursor material with the method according to claim 1;

2) washing, filtering and drying the precursor material obtained in step 1); and 3) uniformly mixing the precursor material with lithium hydroxide, calcining in a furnace in an oxygen atmosphere, and cooling to room temperature to obtain the composite cathode material for gradient-aluminum-type lithium ion battery.

19. The method according to claim 18, wherein step 2) comprises: stirring and washing the precursor material with a solution of sodium chloride having a concentration of 3-30 wt % for 10-60 minutes at 20-80° C.; b) washing the precipitate several times with deionized water at 20-80° C. until the final pH value is lower than 10; and c) placing the washed wet material under 60-150° C. and drying for 6-60 h.

20. The method according to claim 18, wherein step 3) comprises: uniformly mixing the washed and dried precursor material with lithium hydroxide; calcining in a furnace in an oxygen atmosphere under 650-850° C. for 10-30 hours; and cooling to room temperature to obtain the gradient-aluminum-type lithium nickel cobalt aluminum oxide cathode material.

* * * * *